3,480,668
**SUBSTITUTED 3,6-DIHYDROXY-4-CYCLO-
HEXENECARBOXYLIC ACIDS**
Allen K. Sparks, Des Plaines, and Robert A. Dombro,
  Chicago, Ill., assignors to Universal Oil Products Company, Des Plaines, Ill., a corporation of Delaware
No Drawing. Filed Oct. 18, 1965, Ser. No. 497,458
Int. Cl. C07c 61/22
U.S. Cl. 260—514                                   11 Claims

ABSTRACT OF THE DISCLOSURE 3,6-dihydroxy-4-cyclohexenecarboxylic acid and derivatives thereof, and polymeric reaction products thereof with monomers containing reactive functional groups.

---

This invention relates to novel compositions of matter. More particularly, the invention is concerned with novel compositions of matter comprising dihydroxycyclohexenecarboxylic acids and to the use of said compounds as monomers in the preparation of polyester resins.

The use of certain polymeric compositions of matter comprising plastics, resins, etc., has increased to a great degree in a relatively short period of time. For example, in recent years, plastics and resins have found increased use in architectural paneling, acoustical sound deadeners in walls and ceilings, as bodies for airplanes, automobiles and boats and many other uses too numerous to mention at this time. In view of this, plastics and resins must be prepared which will posses desirable characteristics such as hardness, elasticity, resistance to chemicals, shock, abrasion, fire, etc., said characteristics being dependent upon the particular starting materials which are utilized as monomers in the preparation of finished products.

It is therefore an object of this invention to provide a novel composition of matter which may be utilized as a monomer in the preparation of plastics and resins.

A further object of this invention is to provide novel compositions of matter comprising dihydroxycyclohexenecarboxylic acids, which when utilized as a monomer in the preparation of plastics or resins, will impart desirable characteristics to the finished product.

In a broad aspect, one embodiment of this invention resides in a compound having the generic formula:

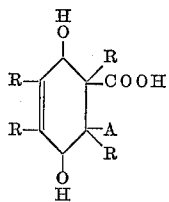

in which the R's are selected from the group consisting of hydrogen, halogen, alkyl, aryl, alkaryl, aralkyl radicals and A is selected from the group consisting of hydrogen, alkyl, aryl, halogen, acyl and aroyl radicals.

A further embodiment of this invention is found in a polymeric composition of matter comprising the reaction product of a monomer containing at least one reactive functional substituent selected from the group consisting of hydroxyl and carboxyl substituents and a dihydroxy-cyclohexenecarboxylic acid.

A specific embodiment of this invention is 1,2-dimethyl-3,6-dihydroxy-4-cyclohexenecarboxylic acid.

Another specific embodiment of this invention is found in a polymeric composition of matter comprising the reaction product of a monomer containing at least one reactive functional substituent selected from the group consisting of hydroxyl and carboxyl substituents and 1-phenyl-3,6-dihydroxy-4-cyclohexenecarboxylic acid.

As hereinbefore set forth, the present invention is concerned with novel compositions of matter and to the use thereof as monomers in the preparation of resins and plastics. The term "dihydroxycyclohexenecarboxylic acid" as used in the present specification and appended claims will refer to substituted dihydroxycyclohexenecarboxylic acids as well as to the acid itself. These novel compositions of matter may be prepared by condensing furan or a substituted furan with an unsaturated carboxylic acid or a substituted unsaturated carboxylic acid in a Diels-Alder type of reaction at condensation conditions. Examples of unsaturated carboxylic acids which may be used possess the generic formula:

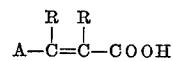

in which R is selected from the group consisting of hydrogen, halogen, alkyl, aryl, aralkyl and alkaryl radicals and A is selected from the group consisting of hydrogen, alkyl, aryl, halogen, acyl and aroyl radicals. Specific examples of these acids include acrylic acid, α-chloroacrylic acid, α-β-dibromoacrylic acid, α-β-dichloroacrylic acid, α-bromoacrylic acid, α-phenylacrylic acid, β-phenylacrylic acid, crotonic acid, isocrotonic acid, vinylacetic acid, methylacrylic acid, α-chlorocrotonic acid, α-dichlorocrotonic acid, α-phenylcrotonic acid, tiglic acid, angelic acid, senecioic acid, the isomeric hexenic acids, teracrylic acids and substituted hexenic and teracrylic acids, etc.

Furans which may be condensed with the aforementioned unsaturated carboxylic acids possess the generic formula:

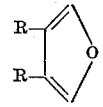

in which R is selected from the group consisting of hydrogen, halogen, alkyl, aryl, alkaryl and aralkyl radicals. Specific examples of these furans include furan, 3-methylfuran, 3-ethylfuran, 3-propylfuran, 3,4-dimethylfuran, 3,4-diethylfuran, 3-chlorofuran, 3-bromofuran, 3,4-dichlorofuran, 3,4-dibromofuran, 3-phenylfuran, 3-benzylfuran, 3-p-tolylfuran, etc. It is to be understood that the aforementioned furans are only representative of the class of compounds which may be used and that the present invention is not necessarily limited thereto.

The condensation between the aforementioned furans and unsaturated carboxylic acids is effected in a Diels-Alder type reaction and preferably in the presence of a substantially inert organic solvent. When utilizing an organic solvent, the temperature at which the condensation is effected will usually be dependent upon the particular solvent which is utilized, said condensation temperature usually being the reflux temperature of the solvent. Examples of organic solvents which may be used include aromatic hydrocarbons such as benzene, toluene, xylene, ethylbenzene, etc.; paraffinic hydrocarbons both acyclic and cyclic in nature such as n-pentane, n-hexane, n-heptane, cyclopentane, methylcyclopentane, cyclohexane, etc.; and ethers such as dimethyl ether, diethyl ether, dipropyl ether, etc.

The desired product comprising the dihydroxycyclohexenecarboxylic acid is then obtained by treating the product resulting from the aforementioned condensation namely, an epoxy cyclohexenecarboxylic acid, in any manner known in the art. One particular method which may be utilized comprises treating said product with acetic anhydride in the presence of a Friedel-Crafts type catalyst such as zinc chloride to obtain an ester which is then hydrolyzed to form the desired dihydroxycyclohexenecarboxylic acid.

The process in which the products of the present invention may be prepared may be effected in any suitable manner and may comprise either a batch or continuous type operation. For example, when a batch type operation is used, a quantity of the furan and the olefinic carboxylic acid along with the substantially inert organic solvent is placed in an appropriate apparatus, and allowed to react at the proper operating conditions of temperature and pressure. These operating conditions of temperature and pressure may include temperatures in the range of from ambient (about 25° C.) to about 150° C. and pressures ranging from atmospheric to about 50 atmospheres, the amount of pressure utilized being that which is necessary to maintain a major portion of the reactants in the liquid phase. Upon completion of the desired residence time, the resultant epoxy compound is recovered by conventional means such as filtration followed by fractional crystallization, fractional distillation, etc. The epoxy adduct is then placed in a second apparatus along with an excess of an esterification agent such as acetic anhydride and a catalytic amount of a Friedel-Crafts metal halide such as zinc chloride, aluminum chloride, etc. The mixture is then heated to the reflux temperature of the esterification agent and maintained thereat for a predetermined residence time, at the end of which time the flask and contents thereof are allowed to cool to room temperature.

The resultant diester may then be hydrolyzed in the presence of a dilute base or dilute acid such as a dilute sodium hydroxide solution, dilute potassium hydroxide solution, dilute hydrochloric acid, etc. It is also contemplated within the scope of this invention that the novel compounds thereof may be prepared in a continuous manner of operation. When such a manner of operation is used, the starting materials comprising the furan and the olefinic carboxylic acid are continuously charged to the reaction vessel which is maintained at the proper operating conditions of temperature and pressure. In addition, an inert organic solvent of the type hereinbefore set forth in greater detail is also continuously charged thereto through a separate line or, if so desired, it may be admixed with one or both of the starting materials prior to entry into said reactor. Upon completion of the desired residence time, the resultant epoxy cyclohexenecarboxylic acid is continuously withdrawn from the reaction vessel and separated from the solvent and any starting materials which may still be present, the latter being recycled for a portion of the feed stock. The desired acid is then charged to a second vessel, also maintained at the proper conditions of temperature and pressure. In addition, the esterification agent is also charged to this second vessel through a separate line. In this second vessel, the esterification of the epoxy cyclohexenecarboxylic acid is effected in the presence of a catalytic amount of a metal halide. The resultant diester of the cyclohexenecarboxylic acid is continuously withdrawn and separated from any starting materials and/or any side reaction products which may have been formed. It is to be understood that in a process of this type, in each case, the reactor effluent from the reaction zones is subjected to these separation steps whereby the desired product from each zone is separated from the unreacted starting materials in each step, the aforementioned unreacted starting materials being recycled to form a portion of the feed stock to each respective reaction zone.

Following this, the diester of the cyclohexenecarboxylic acid is then charged to a third zone wherein it is hydrolyzed to form the desired dihydroxycyclohexenecarboxylic acid.

Examples of dihydroxycyclohexenecarboxylic acids which may be prepared, and which, according to the present invention, constitute novel compositions of matter include 3,6-dihydroxy-4-cyclohexenecarboxylic acid,
1-methyl-3,6-dihydroxy-4-cyclohexenecarboxylic acid,
1,2-dimethyl-3,6-dihydroxy-4-cyclohexenecarboxylic acid,
1,2,5-trimethyl-3,6-dihydroxy-4-cyclohexenecarboxylic acid,
1-ethyl-3,6-dihydroxy-4-cyclohexenecarboxylic acid,
1,2-diethyl-3,6-dihydroxy-4-cyclohexenecarboxylic acid,
1,2,5-triethyl-3,6-dihydroxy-4-cyclohexenecarboxylic acid,
1-propyl-3,6-dihydroxy-4-cyclohexenecarboxylic acid,
1,2-dipropyl-3,6-dihydroxy-4-cyclohexenecarboxylic acid,
1,2,5-tripropyl-3,6-dihydroxy-4-cyclohexenecarboxylic acid,
1-chloro-3,6-dihydroxy-4-cyclohexenecarboxylic acid,
1,2-dichloro-3,6-dihydroxy-4-cyclohexenecarboxylic acid,
1,2,5-trichloro-3,6-dihydroxy-4-cyclohexenecarboxylic acid,
1-bromo-3,6-dihydroxy-4-cyclohexenecarboxylic acid,
1,2-dibromo-3,6-dihydroxy-4-cyclohexenecarboxylic acid,
1,2,5-tribromo-3,6-dihydroxy-4-cyclohexenecarboxylic acid,
1-phenyl-3,6-dihydroxy-4-cyclohexenecarboxylic acid,
1,2-diphenyl-3,6-dihydroxy-4-cyclohexenecarboxylic acid,
1-benzyl-3,6-dihydroxy-4-cyclohexenecarboxylic acid,
1-(p-tolyl)-3,6-dihydroxy-4-cyclohexenecarboxylic acid, etc.

It is to be be understood that the aforementioned compounds are only representative of the class of compounds which may be prepared and that the present invention is not necessarily limited thereto.

The novel compositions of matter thus produced may be utilized as components of finished plastics and resins which may be generically termed "polymeric compositions of matter," the polymeric compositions of matter possessing the desirable characteristics according to the monomers which are utilized. The dihydroxycyclohexenecarboxylic acids may be polymerized per se or co-polymerized via the carboxylic function with di-, tri-, etc., hydroxy compounds such as ethylene glycol, propylene glycol, butylene glycol, diethylene glycol, dibutylene glycol, hydroquinone, catechol, resorcinol, glycerol, pyrogallol, etc., and via the dihydroxy function with di-, tri-, etc., carboxylic acids such as oxalic acid, malonic acid, succinic acid, glutonic acid, etc., tricarballylic acid, etc., phthalic acids, mellitic acids, etc., and anhydrides such as maleic anhydride, succinic anhydride, glutoniconic anhydride, phthalic anhydride, etc., to form polyesters. These polyesters will contain unsaturation in certain portions of the molecule which will allow further polymerization, said polymerization being initiated by peroxide or by an air-drying action. The polyesters thus prepared may comprise low molecular-weight unsaturated compounds which can then be epoxidized and used as stabilizing plasticizers for polyvinyl chloride resins. It is also contemplated that the unsaturated polyester thus produced by the reaction between the dihydroxycyclohexenecarboxylic acid or anhydride thereof and the compound containing hydroxyl and/or carboxyl functional groups may be further reacted with vinyl monomers such as styrene to form compounds which are utilizable as thermal-setting resins. If the polyester resin contains —OH terminals, it may be admixed with a diiocyanate such as, for example, tolylenediisocyanate, to form polyurethane intermediates which can then be foamed by the addition of a foaming agent such as water, tertiary alcohols, etc., to form the desired polyurethane foams. The aforementioned preparation of the polyester plastic or resin may be effected at temperatures ranging from room temperature up to about 300° C. and a residence time ranging from a few minutes up to about 25 hours, the residence time being inversely proportional to the temperature at which the reaction is carried out.

The following examples are given to illustrate the process of the present invention which, however, are not intended to limit the generally broad scope of the present invention in strict accordance therewith.

Example I

A desired product is prepared by admixing 136 g. (2.0 mole) of furan and 142 g. (2.0 mole) of acrylic acid in 200 cc. of anhydrous ethyl ether, said admixture taking place in a condensation flask. The solution is allowed to stand at room temperature (about 25° C.) for a period of about 16 hours. During this time, the adduct comprising 3,6-epoxycyclohexenecarboxylic acid will deposit out as crystals. These crystals are isolated by filtration.

The 3,6-epoxy-4-cyclohexenecarboxylic acid which is prepared according to the above paragraph is placed in a flask provided with a reflux condenser and an excess of acetic anhydride is added thereto. In addition, 5 g. of zinc chloride is placed in the flask which is thereafter heated to a temperature of between 140° and 145° C. The solution is refluxed for a period of about 4 hours at the end of which time the flask and contents thereof are allowed to cool to room temperature, the diacetate ester of the acid being recovered therefrom by conventional means.

The diacetate ester is then hydrolyzed by treating said ester with a dilute solution of sodium hydroxide, the reaction mixture being dissolved in a solvent comprising an alcohol. After treatment for a period of about 4 hours, the reaction mixture is subjected to fractional distillation under reduced pressure and the desired product comprising 3,-6-dihydroxy-4-cyclohexenecarboxylic acid is recovered.

Example II

In this example, 192 g. (2.0 moles) of 3,4-dimethylfuran and 142 g. (2.0 moles) of acrylic acid along with 250 cc. of anhydrous ethyl ether are placed in a condensation apparatus. The apparatus and contents thereof are allowed to stand at ambient temperature (about 25° C.) for a period of about 16 hours, during which time the adduct comprising 1,2-dimethyl-3,6-epoxy-4-cyclohexenecarboxylic acid will crystallize out. The crystals are recovered from the reaction mixture by filtration and conventional means such as washing and drying following which they are placed in a reaction apparatus provided with reflux means. An excess of acetic anhydride and a catalytic amount of zinc chloride is added to the flask following which the flask and contents thereof are heated to a temperature of about 140° C. The reaction mixture is maintained at a temperature in the range of from about 140° to about 145° C. for a period of about 4 hours. Following this the flask and contents thereof are allowed to cool to room temperature. The desired product comprising the diacetate ester of the cyclohexenecarboxylic acid is recovered by fractional crystallization.

The desired product is then prepared by dissolving the ester prepared according to the above paragraph in an alcohol and adding thereto a dilute solution of sodium hydroxide. Upon completion of the hydrolysis step, the desired product comprising 1,2-dimethyl-3,6-dihydroxy-4-cyclohexenecarboxylic acid is separated and recovered by conventional means.

Example III

A solution of 96 g. (1.0 mole) of 3,4-dimethylfuran and 87 g. (1.0 mole) of crotonic acid in 250 cc. of anhydrous ethyl ether is placed in a condensation flask. The flask and contents thereof are allowed to stand at room temperature for a period of about 16 hours, during which time the adduct will crystallize or precipitate out. The desired adduct comprising 3,6-epoxy-1,2,5-trimethyl-4-cyclohexenecarboxylic acid is recovered by conventional means such as filtration, washing and drying.

The product prepared according to the above paragraph is then placed in a reflux condenser along with an excess of acetic anhydride and a catalytic amount of zinc chloride. The resulting solution is then refluxed at a temperature of from 140° to 145° C. for a period of about 4 hours, after which the diacetate ester is separated and recovered.

Following this, the diacetate ester is hydrolyzed by treatment with a dilute solution of potassium hydroxide, the treatment being effected in the presence of an alcohol to obtain the desired 1,2,5-trimethyl-3,6-dihydroxy-4-cyclohexenecarboxylic acid.

Example IV

In this example, 137 g. (1.0 mole) of 3,4-dichlorofuran and 71 g. (1.0 mole) of acrylic acid is treated in a manner similar to that set forth in the above examples. The adduct comprising 1,2-dichloro-3,6-epoxy-4-cyclohexenecarboxylic acid is recovered by conventional means and treated with an excess of acetic anhydride in the presence of zinc chloride to form the diacetate ester thereof. The ester is then hydrolyzed by treatment with a dilute hydrochloric acid in the presence of a solvent comprising an alcohol to form the desired 1,2-dichloro-3,6-dihydroxy-4-cyclohexenecarboxylic acid.

Example V

A solution of 143 g. (1.0 mole) of 3-phenylfuran and 71 g. (1.0 mole) of acrylic acid in 250 cc. of anhydrous ethyl ether is allowed to stand at ambient temperature for a period of 16 hours. The resulting adduct comprising 1-phenyl-3,6-epoxy-4-cyclohexenecarboxylic acid is esterified after recovery from the reaction mixture by treatment with an excess of acetic anhydride in the presence of a catalytic amount of zinc chloride in a manner similar to that set forth in Examples I to III above. To obtain the desired product, the diacetate ester is hydrolyzed by treatment with a dilute sodium hydroxide solution and a solvent comprising an alcohol and the desired product comprising 1-phenyl-3,6-dihydroxy-4-cyclohexenecarboxylic acid.

Example VI

To illustrate the use of the novel compositions of matter of the present invention as monomers, a polyester resin may be prepared by charging glycerine or pentaerythritol to a flask which is then swept with nitrogen and heated to a temperature of between 90° and 100° C. Following this, 3,6-dihydroxy-4-cyclohexenecarboxylic acid and maleic anhydride are added to the flask. The flask is then heated to a temperature of about 165° C. and maintained at this temperature for a period of about 6 hours. At the end of this time, the resultant polyester resin is recovered.

Example VII

Other polyester resins may be prepared utilizing the acids prepared according to the Examples II to V above. These resins are prepared by utilizing said acids with glycerol or pentaerythritol in a manner similar to that set forth in Example III above. After maintaining the reaction mixture at an elevated temperature in the range of from about 165° to about 175° C. for a period of about 8 hours, maleic anhydride is added and the reaction allowed to proceed for an additional period of time. At the end of the aforementioned reaction time, the particular resin may be recovered and further treated by the addition of styrene. The mixture is further heated to a temperature of from about 70° to about 90° C. and maintained thereat for a period of about 2 hours. At the end of this time, the desired polyester resin is recovered.

We claim as our invention:

1. 3,6-dihydroxy-4-cyclohexenecarboxylic acid having in the 1- or 2- or 5-position a substituent selected from the group consisting of alkyl of from 1 to 3 carbon atoms, chlorine, bromine, phenyl, benzyl and tolyl.

2. 1,2-dimethyl-3,6-dihydroxy-4-cyclohexenecarboxylic acid.

3. 1,2,5-trimethyl-3,6-dihydroxy-4-cyclohexenecarboxylic acid.

4. 1,2 - dichloro-3,6-dihydroxy-4-cyclohexenecarboxylic acid.

5. 1-phenyl-3,6-dihydroxy - 4 - cyclohexenecarboxylic acid.

6. 3,6-dihydroxy-4-cyclohexenecarboxylic acid having an alkyl group of from 1 to 3 carbon atoms in the 1-position.

7. 3,6-dihydroxy-4-cyclohexenecarboxylic acid having alkyl groups of from 1 to 3 carbon atoms in the 1- and 2-positions.

8. 3,6-dihydroxy-4-cyclohexenecarboxylic acid having alkyl groups of from 1 to 3 carbon atoms in the 1, 2 and 5-positions.

9. 3,6-dihydroxy-4-cyclohexenecarboxylic acid having chlorine or bromine in the 1-position.

10. 3,6-dihydroxy-4-cyclohexenecarboxylic acid having chlorine or bromine in the 1- and 2-positions.

11. 3,6-dihydroxy-4-cyclohexenecarboxylic acid having chlorine or bromine in the 1-, 2- and 5-positions.

References Cited

McCrindle et al., J. Chem. Soc. (1960), 1560–5.

LORRAINE A. WEINBERGER, Primary Examiner

PAUL JOHN KILLOS, Assistant Examiner

U.S. Cl. X.R.

260—47, 78.3, 347.3, 468, 469, 475, 485, 488, 520